E. F. HUDSON.
RESILIENT WHEEL.
APPLICATION FILED MAR. 25, 1916.
1,200,112.
Patented Oct. 3, 1916.
2 SHEETS—SHEET 1.
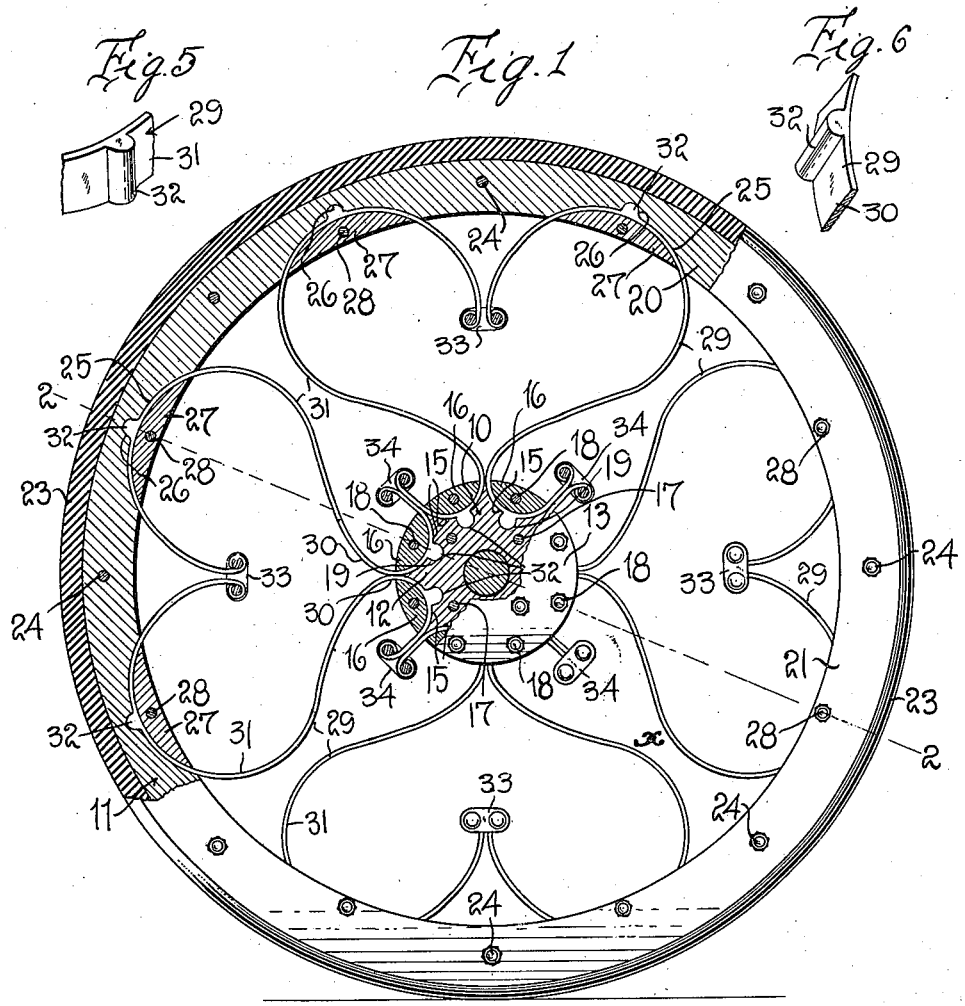
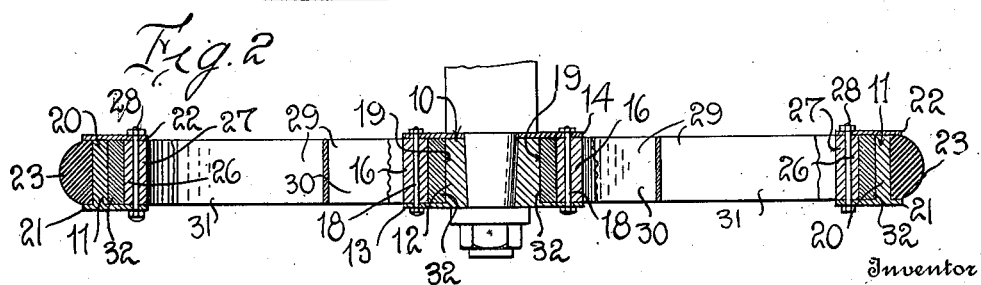
Inventor
EDWARD F. HUDSON
By Watson E. Coleman
Attorney E. F. HUDSON.
RESILIENT WHEEL.
APPLICATION FILED MAR. 25, 1916.
1,200,112.
Patented Oct. 3, 1916.
2 SHEETS—SHEET 2.
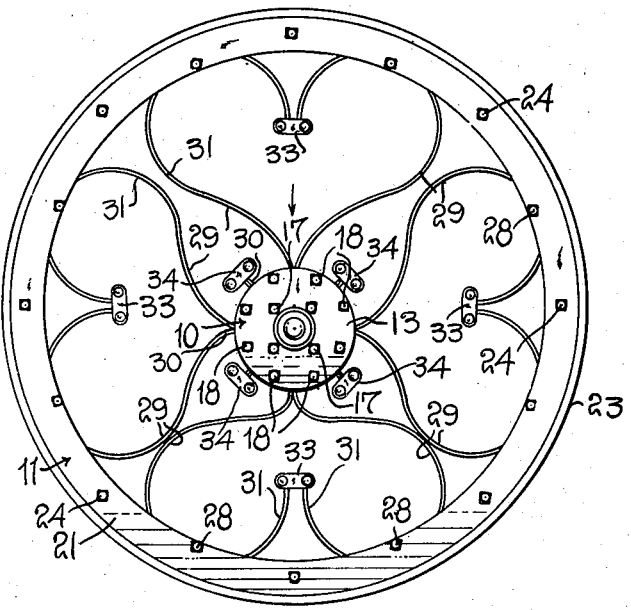
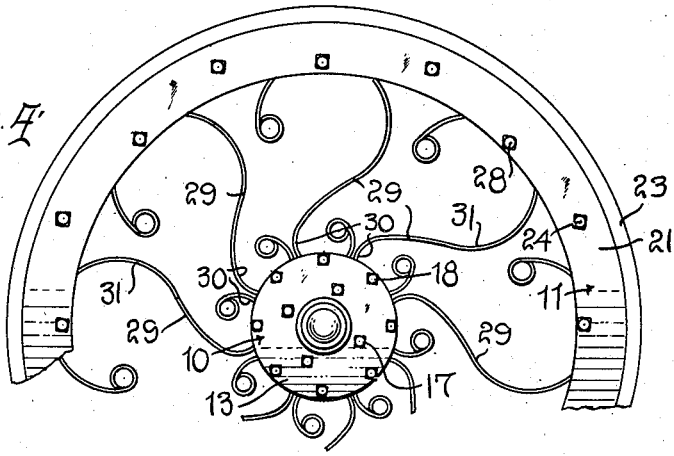
Inventor
EDWARD F. HUDSON
By Watson E. Coleman
Attorney

UNITED STATES PATENT OFFICE.

EDWARD F. HUDSON, OF WILKES-BARRE, PENNSYLVANIA.

RESILIENT WHEEL.

1,200,112.  Specification of Letters Patent.  Patented Oct. 3, 1916.

Application filed March 25, 1916. Serial No. 86,714.

*To all whom it may concern:*

Be it known that I, EDWARD F. HUDSON, citizen of the United States, residing at Wilkes-Barre, in the county of Luzerne and State of Pennsylvania, have invented certain new and useful Improvements in Resilient Wheels, of which the following is a specification, reference being had to the accompanying drawings.

This invention relates to resilient wheels, and more particularly to that class of resilient wheel in which a rim section is connected to and supported upon a hub section by curved spring spokes.

The general object of the invention is to produce a simple, cheaply constructed, and relatively light resilient or cushion wheel which is particularly rigid as regards lateral thrusts and which will do away with the use of pneumatic tires.

A further object of the invention is to so construct the rim and hub that any one or all of the springs may be readily detached and replaced.

Still another object in this connection is to provide the rim and hub with curved seats for the curved ends of the springs, these curved seats bearing over a relatively large extent of the spring and provide detachable members locking the ends of the springs in place in the rim and hub respectively.

A still further object is to provide means whereby to hold the curved outer ends of the springs in firm and rigid engagement with the rim and hub, to lock the springs in place, and to support those portions of the springs which are engaged with the hub and rim. And a still further object is to so arrange the springs that when the vehicle is under a light load the springs will be separated and not in contact with each other and will therefore have a maximum resiliency, but that when the vehicle is carrying a heavy load or is subjected to a heavy shock, the springs will engage with each other and be stiffened by such engagement.

Other objects will appear in the course of the following description.

My invention is illustrated in the accompanying drawings, wherein:

Figure 1 is a side elevation, partly in section, of one form of my improved wheel; Fig. 2 is a section on the line 2—2 of Fig. 1; Fig. 3 is a side elevation of the wheel shown in Fig. 1 but illustrating the manner in which the springs act under a load; Fig. 4 is a fragmentary side elevation of a form of wheel in which the springs are reversely placed to that shown in Fig. 1; Fig. 5 is a fragmentary perspective view of the loop 31 with the rib 32; and Fig. 6 is a fragmentary perspective view of one of the loops 30, showing the protuberance or rib 32.

Referring to Fig. 1, it will be seen that my improved wheel comprises a hub section, designated generally 10, and a rim section designated generally 11. The hub section is composed of a central annulus 12 having a side flange 13 preferably formed integral therewith, and a detachable plate 14, which, when in place, forms a flange projecting from the body of the hub and confronting the flange 13. These flanges 13 and 14 are separated a distance equal to the width of the springs to be used. Formed in the circumference of the middle hub section 12 are a plurality of spring seats 15, these spring seats being in the form of concave recesses extending from the periphery of the hub section and adapted to be inserted in said concave recesses are a plurality of locking members or blocks 16 which on their inner faces are convex, the curvature of the inner faces being the same as the curvature of the spring seats. The outer faces of the blocks are slightly curved so that when the blocks are in place the outer faces of the blocks will be concentric to the axis of the portion 12 of the hub. Bolts 17 extend transversely through the portion 12 and hold the plate 14 firmly in place. Bolts 18 extend through the locking blocks 16 and through the plate 14 and the opposite flange or wall 13. Each seat 15 is formed with a groove 19 whose purpose will be later described. Of course the annular hub is adapted to rest upon an axle or be engaged with an axle or shaft in any suitable manner.

The rim 11, like the hub, consists of an annular body 20 formed with a flange 21, and connected to this annular body is a plate 22 which projects beyond the annular body and confronts the flange 21 and itself forms a flange opposed to the flanges 21. The space on the outside of the rim between the flange 21 and the projecting margin of the plate 22 constitutes a seat for a tread or tire 23. The plate 22 is held to the body 20 by means of transverse bolts 24. The inner face of the body 20 is formed with a plurality of concave spring seats 25, each of these seats being grooved as at 26, and fitting within each of these seats is a locking block 27 having a convex inner face conforming in curvature to the concavity of the recess 25 and a slightly convex outer face concentric to the axis of the wheel. These locking blocks are held in position by means of bolts 28.

Referring still to Fig. 1, it will be seen that I have provided a plurality of pairs of springs designated 29. These springs are S-shaped and have each a relatively small loop 30 and a large loop 31. The small loop or bend of each spring fits in a corresponding spring seat in the hub section, while the large loop 31 fits in the corresponding spring seat in the rim section. As before stated, the springs have a width equal to the distance between the flanges 13 and 14 of the hub and the flanges 21 and 22 of the rim. The locking blocks 16 and 29, respectively, hold the springs rigidly in place. Each spring is formed at its outer and inner ends with ribs 32 which engage in the grooves formed in the spring seats of the hub and rim so that the springs cannot slip through the spring seats and are securely locked in place when the locking blocks are disposed in position. As will be seen from Fig. 1 the extremities of the outer loops project inward beyond the inner face of the rim and the projecting ends of each pair of springs are connected by means of the clips 33. The inner ends of the adjacent springs also project outward beyond the periphery of the hub and are connected by clips 34. I do not wish to be limited to any particular construction for these clips.

It will be noted that the springs are reversely disposed to each other so that the outer ends of two adjacent springs are connected and the inner ends of the same springs while contacting with each other where they enter the hub, are engaged with other springs on each side where they project from the hub. It is also to be particularly noted that the large loops 31 of each pair of springs are spaced from the large loops 31 of adjacent springs so that the space $x$ is left between the pairs of springs which permits a flexing of these springs except under heavy loads.

In Fig. 4 I have shown a construction which is exactly like the constructions heretofore described, except that the springs are not reversely placed, but in this case the springs are disposed with the large loops all extending in the same direction and the small loops extending in a reverse direction to the large loops. The connection of the springs to the hub and rim is made precisely as in the form shown in Fig. 1 and therefore the same reference numerals have been used for these parts. The same reference numerals are used for the springs inasmuch as the springs are exactly the same form as heretofore described. In this form of wheel, however, the outer ends of the springs are not connected by clips 33 nor are the inner ends of the springs connected by the clips 34, this being rendered impossible by the distance between the outer extremities of the springs and the distance between the inner extremities of the springs.

In both forms of this invention it will be seen that the inner ends and outer ends of the springs are firmly and rigidly engaged with the hub and rim, respectively, and that the flanges on the hub section and on the rim section engage each side edge of the springs. This gives great rigidity to the springs against lateral thrusts and is particularly effective where the wheel is running over rough roads and in which the wheels is continually subjected to lateral stresses. The springs cannot twist with relation to the hub or rim. The springs may be made either of material cylindrical in cross section or of flat springs though I prefer flat springs. With this construction it is obvious that if any spring should break it may be easily removed and replaced by removing the locking members 27 and 16, or by removing the side plates 14 and 28, and with this construction even though one of the springs should break yet a portion of the springs will still coact with the next adjacent spring because of the fact that the springs are rigidly held in what is practically a solid rim and practically a solid hub. By having the springs formed with the large loops 31, a great deal of resiliency is secured and there is no chance of any sudden jars or jerks. Furthermore, it will be seen that a depression of the hub with relation to the rim as seen in Fig. 3, will not only compress the pair of springs which happen to be at the lowest point of the wheel but will expand those springs at the highest point of the wheel and will flex the springs which at the moment are at the front and rear of the wheel, and it is a most important part of my invention that when the load on the hub is very heavy the enlarged loops of the springs will come together and thus one spring will resist the thrust of the other springs and the springs will be rendered much more rigid and unyielding. This is particularly true of the construction shown in Fig. 1 where a compression of the large loops of the springs will cause these loops to take a somewhat elliptical form and thereby press against each other. The construction shown in Fig. 4, however, is adapted for lighter loads than that illustrated in Fig. 1. Attention is also called to the fact that in both forms of my invention the springs add to the ornamental characteristics of the wheel and this is particularly true of the form illustrated in Fig. 1.

While I have illustrated only four pairs of springs in the wheels shown in Figs. 1 and 4, it is of course to be understood that a greater number of pairs of springs may be used if found necessary, particularly in large sized wheels which have to withstand relatively great shocks. I do not wish to be limited, therefore, to any particular number for the pairs of springs.

Having described the invention, what I claim is:

1. In a resilient wheel, a hub having peripheral spring seats, a rim having spring seats on its inner face, a plurality of S-shaped springs having their loops disposed in the hub and rim seats respectively, and means for locking the springs in place in said seats, each spring being reversely disposed relative to an adjacent spring, the ends of the loops of each spring being operatively connected to the ends of the loops of the adjacent springs.

2. In a resilient wheel, a hub, a rim, and S-shaped springs disposed between the hub and rim and engaged therewith, the inner loops of the springs being in contact with each other, the outer loops of certain of the springs being normally out of contact with each other but engaging with each other upon a compression of the springs.

In testimony whereof I hereunto affix my signature in the presence of two witnesses.

EDWARD F. HUDSON.

Witnesses:
GEORGE M. KASE,
E. C. RINK.